United States Patent
Mueller et al.

(10) Patent No.: US 7,099,755 B2
(45) Date of Patent: Aug. 29, 2006

(54) AUTOMATION AND PLATFORM MANAGEMENT SYSTEM FOR NAVAL VESSELS

(75) Inventors: Karl-Heinz Mueller, Tarmstedt (DE); Matthias Schulze, Lueneburg (DE)

(73) Assignee: Siemens Aktiengesellschaft, Munich (DE)

( * ) Notice: Subject to any disclaimer, the term of this patent is extended or adjusted under 35 U.S.C. 154(b) by 465 days.

(21) Appl. No.: 10/448,225

(22) Filed: May 30, 2003

(65) Prior Publication Data

US 2004/0243859 A1 Dec. 2, 2004

(51) Int. Cl.
*B63B 49/00* (2006.01)
*B63H 21/22* (2006.01)
*G06F 19/00* (2006.01)

(52) U.S. Cl. .................... 701/21; 701/36; 701/213; 342/41; 340/984

(58) Field of Classification Search ............... 701/21, 701/36, 213; 340/984; 342/357.07, 41, 342/59
See application file for complete search history.

(56) References Cited

U.S. PATENT DOCUMENTS

| | | | | |
|---|---|---|---|---|
| 6,249,241 B1* | 6/2001 | Jordan et al. | ............... | 342/41 |
| 6,273,771 B1* | 8/2001 | Buckley et al. | ............... | 440/84 |
| 6,816,088 B1* | 11/2004 | Knoska et al. | ............... | 340/984 |
| 6,837,758 B1* | 1/2005 | Drefs et al. | ............... | 440/6 |
| 2003/0152892 A1* | 8/2003 | Huang et al. | ............... | 434/11 |

OTHER PUBLICATIONS

Petersen, S. T., "The Command, Control, Communication and Information System," Standard Flex 300. True Multi-Role Ship, Mar. 1992, pp. 10-11.
Ryle, M., "One man bridge operation," The Motor Ship, Reed Business Information, Ltd: Sutton, Sep. 1, 1997, pp. 41, 43-44, vol. 78, No. 926.
Chou, L-D, et al., "Design of Shipboard LAN and Interworking to the Internet," Global Information Infrastructure (GII) Evolution: Interworking Issues. Third International Symposium on Interworking, Nara, Japan, Oct. 1-3, 1996, pp. 392-401, Amsterdam, IOS, NL.

* cited by examiner

Primary Examiner—Tan Q. Nguyen
(74) Attorney, Agent, or Firm—Sughrue Mion, PLLC

(57) ABSTRACT

An automation and platform management system for navel vessels configured to be operated from a multimedia information and operation control center. This automation and management system has a system for monitoring and commanding the ship, a system for navigating the ship, a system for coordinating weapons deployment, a system for handling the external and internal radio communications, a system for controlling and handling the information distribution, a system for power generation and distribution (power management monitoring), and a system for monitoring ship operations. To be able further to reduce the number of crewmembers of a ship equipped with the automation and management system, the automation and management system further has a system for automated ship damage control and/or an integrated onboard information and data network (2) and/or an integrated system for monitoring and control of a COPAW drive of the ship.

17 Claims, 8 Drawing Sheets

AUTOMATION AND PLATFORM MANAGEMENT SYSTEM FOR NAVAL VESSELS

FIELD OF AND BACKGROUND OF THE INVENTION

The invention relates to an automation and platform management system for navel vessels, which can be operated from an operator island of a multimedia information and operation control center and which is equipped with a system for monitoring and commanding the ship, a system for navigating the ship, a system for coordinating weapons deployment, a system for handling external and internal radio communications, a system for controlling and handling information distribution, a system for power generation and distribution (power management monitoring) and a system for monitoring ship operations.

OBJECTS OF THE INVENTION

Ships or naval surface vessels equipped with such automation and platform management systems need to be capable, in the future, of being operated with a smaller crew. Thus one object of the invention is to further develop the initially described generic automation and platform management system in such a way that, for example, group control stations for ship protection and the machinery control room can be eliminated.

SUMMARY OF THE INVENTION

According to one formulation of the invention, this and other objects are attained by providing the automation and platform management system with a system for automated ship damage control and/or an integrated onboard information and data network and/or an integrated system for monitoring and controlling a combined pod and waterjet (COPAW) drive of the ship. The configuration of the automation and management system according to the invention makes it possible to operate the ship or naval ship under all conceivable conditions with a much smaller crew.

In an advantageous further development of the automation and management system according to the invention, the system is equipped with an emergency control console, which is preferably disposed in the stern of the ship near the podded drive of the COPAW drive.

All of the automation functions can be performed from the operator island in the multimedia information and operation control center. This is also true for damage control in the event of fire or leaks. In case of deployment, no crewmembers are stationed outside the central battle stations. Effective automated functions related to firefighting and the isolation of sections of the ship are integrated into the above-described automation and platform management system.

The integrated onboard information and data network is preferably formed of meshed partial networks.

The automation and platform management system can be configured such that it can be operated from a land-based operating terminal.

To minimize the loads of the integrated onboard information and data network with data to be forwarded, it is advantageous to use sensors with integrated data preprocessing for measuring parameters.

It is similarly advantageous to provide intelligent actuator units as peripheral units by means of which incoming signals transmitted via a bus system can be converted into the values provided for actuating the respective actuator unit.

By configuring the sensors with built-in data preprocessing at least partially as wireless sensors it is possible substantially to save on cable connections and the underlying constructional measures. Similar advantages are obtained if the actuator units of the automation and platform management system according to the invention are also at least partially configured as wireless actuators.

Repair and maintenance can be carried out at comparatively low cost if the sensors with built-in data preprocessing are configured as quickly replaceable sensor units.

A more effective operation of the integrated onboard information and data network is moreover achieved if a central data collection unit is provided for each section or ship protection zone. This central unit collects all the data obtained in the corresponding section or ship protection area.

To prevent losing comparatively much time in determining the location of the crewmembers, it is proposed that the automation and platform management system according to the invention be equipped with a system for monitoring and detecting the location of each crewmember. Among other things, this system can include preferably wireless sensors, preferably IR sensors, intelligent video cameras and/or contactless presence or proximity detectors.

The individual components of the automation and platform management system should preferably be redundant to the extent possible.

The individual redundant components of the automation and platform management system are preferably configured in such a way that emergency circuits can be automatically established in the event of damage.

Data communication in the onboard information and data network is made multiply redundant by network meshing and a high bandwidth for transmitting measured values, video data, voice data, etc.

The operator island for the automation and platform management system provided in the multimedia information and operation control center of the ship is equipped with two or more display units, which can be configured as 20-inch display units and cross-operated by a keyboard and a trackball device, and with headphones used for transmitting plain text alarm messages.

Each display can display up to a maximum of four of the initially described systems.

The operator island of the automation and platform management system can be equipped with voice input devices, virtual keyboards and/or touch screens.

To implement extensive redundancy, the automation and platform management system preferably features a multi-server architecture and several computers, preferably three computers, one of which can be operated as a master while the others remain in standby operation. The computers remaining in standby operation are continuously updated.

To deal with the flood of collected data, it is advantageous if the lines of the onboard information and data network are designed for optical fiber, ATM [Asynchronous Transfer Mode] or dual redundant ring technology.

Advantageously, the onboard information and data network is provided with interfaces to the power generation and distribution network.

Advantageously, decision algorithms are implemented in the automation and platform management system to support an operator's decision making.

In addition, database and rule-based expert systems should be integrated in the automation and platform management system.

The automation and platform management system advantageously has a counter which counts the number of decision proposals made by the automation and platform management system that are accepted by the operator. The percentage of the decision proposals accepted by the operator can be used to influence the decision making process of the automation and platform management system.

Ship-specific data critical for the deployment of the ship can advantageously be displayed continuously and in a simplified manner in conjunction with extract formation.

At least one interface should be provided for control and weapons deployment systems.

To make the automation and platform management system as flexible and interference-immune as possible, it is advantageous to divide it into independent partial systems, each of which has a computer unit assigned to it, which can be operated without a higher level.

To reduce costs, standard interfaces are used to connect the independent partial systems to each other and to the higher level of the automation and platform management system.

Each independent partial system should preferably have an associated on-site operator panel.

The onboard information and data network is advantageously divided into segments by danger zones.

Each segment of the onboard information and data network should have a decentralized, electrically isolated power supply assigned to it.

To reduce the complexity of operating the automation and platform management system it is advantageous to provide internal error detection.

For early detection of any damage, irregularities, etc., it is advantageous if rotating units are equipped with temperature sensors, pressure sensors, acoustic sensors and vibration sensors whose measured values can be mathematically linked.

Based on the measured process values, it should be possible to propose required maintenance and/or repairs.

A certified operating system is advantageously implemented in the automation and platform management system according to the invention.

The data necessary for the administration of authorized users should be stored in a distributed manner and accessible from any computer.

According to a further advantageous embodiment of the automation and platform management system according to the invention, the backup and/or storage media are made redundant in the individual partial systems or segments.

Ship-specific data should be provided with a special safeguard.

To prevent unauthorized operation of the automation and platform management system according to the invention by unauthorized persons, biometric access control means should be provided.

Decisions to be made by the automation and platform management system can advantageously be classified into ship safety relevant and non-ship safety relevant decisions and decisions endangering humans. For decisions endangering humans, the automation and platform management system must request a decision by the operator.

In special cases of disaster or battle, an emergency operating state should be provided for the automation and platform management system in which the automation and platform management system can independently make decisions endangering humans or ship safety-relevant decisions.

The video camera system of the automation and platform management system can have an associated image analysis with smoke detection, infrared signature and motion detection.

Advantageously, a contactless identification system is furthermore integrated in the automation and platform management system to monitor the location of the crewmembers.

In one advantageous embodiment, the automation and platform management system enables interactive onboard training of the operators involved.

In the event of damage, it should be possible to generate an automatic situation assessment.

To further reduce the operating complexity, the automation and platform management system can advantageously be connected with a corresponding automation and platform management system of another ship and/or with a land-based control center by means of a suitable interface.

This suitable interface can be configured as a direct cable connection or as a wireless interface, e.g., as an interface for alarm messages sent for example to a service mobile phone or other external service stations or centers.

To save weight it is useful to make the switchgear cabinets, desks, consoles, etc., of the automation and platform management system from innovative low-weight materials.

To enable the automation and platform management system according to the invention to be operated from as many different points as possible, it should be capable of being connected to mobile operating and monitoring terminals by means of corresponding interfaces.

The control algorithms for controlling or regulating noise-generating operating units of the ship should be configured taking into account low noise signatures.

Documentation elements, such as text, video and maintenance data, etc., can advantageously be maintained and managed electronically and centrally using database systems.

The automation and platform management system is configured for predictive/preventive maintenance. It can also be used to schedule maintenance and service personnel and to manage the life cycle of system components and machine parts.

It is further advantageous if the automation and platform management system can be used for inventory management, spare parts management and order processes.

The automation and platform management system should be capable of communicating with a higher-level management system, e.g., of a base or a support station, through wired or wireless communication.

The cost of operating the automation and platform management system is further reduced if external remote maintenance is implemented.

To be able to respond to special situations quickly and reliably it is advantageous if certain alarm conditions are linked with associated documents so that event-specific, context-sensitive assistance can be implemented.

The automation and platform management system according to the invention should advantageously be configured as an onboard Intranet insofar as crewmembers can enter and retrieve information.

The Intranet of the automation and platform management system in interaction with its Web-capable servers can act as an interface to the Internet.

The Intranet can advantageously be connected to an Intranet of one or several other ships.

The Intranet can also be connected to a land-based Intranet.

BRIEF DESCRIPTION OF THE DRAWINGS

The invention will now be described in greater detail with reference to embodiments depicted in the drawing in which.

DETAILED DESCRIPTION OF THE PREFERRED EMBODIMENTS

An automation and platform management system according to the invention, which is described in greater detail with the aid of embodiments and with reference to FIGS. 1 to 11, can be operated from an operator island 1 of a multimedia information and operation control center of a platform, e.g., a ship.

An embodiment of an automation and platform management system according to the invention includes a system for navigating the ship, a system for coordinating weapons deployment, a system for handling external and internal radio communications, a system for controlling and handling information distribution, a system for automatically carrying out ship damage control, an integrated onboard information and data network (2), an integrated system for monitoring and controlling a COPAW drive of the ship, a system for power generation and distribution (power management monitoring) and a system for monitoring ship operations.

Using the automation and platform management system it is possible to operate a ship of the frigate class with a crew of less than 100. Group control stations for ship protection and a machinery control room can be eliminated. The automation and platform management system is provided with an emergency control console, which can be arranged in the stern near the POD(s) of the COPAW drive. An emergency deployment system (EDS) can be provided separately from the emergency control console.

The processes and events associated with ship protection, i.e., damage control in the event of an onboard fire or water leaks are automated as far as possible. All of the automation functions are performed from the operator island 1 of the automation and platform management system. Thus, the damage control measures in the event of fire or leaks are managed from the operator island 1.

The ship is run centrally from the multimedia information and operation control center. In the event of deployment, no crewmembers are located outside the central battle stations. As a result, effective automation functions regarding fire fighting and isolation of ship segments can be integrated in the main operations rooms. A corresponding action involves only the equipment and systems located in the respective area.

The above-described central operability from the operator island 1 in the multimedia information and operation center requires extensive acquisition of information and measured data. An appropriate integrated onboard information and data network 2, shown in an embodiment depicted by way of example in FIG. 2*a*, requires a multiply redundant design. Accordingly, the integrated onboard information and data network 2 is configured as a meshed network, which has not only high availability but also offers a high bandwidth for transmitting data of all types, e.g., measured values, video images and voice.

Figure 1:
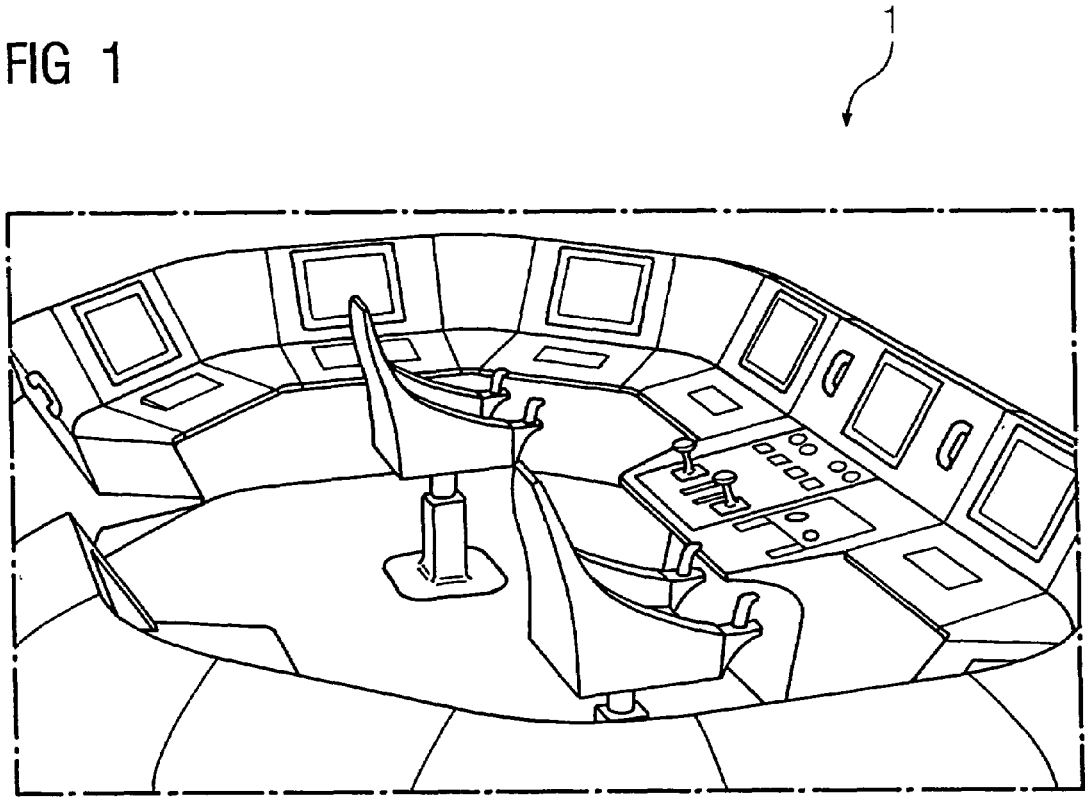
FIG. 1 shows an operator island of a multimedia information and operation control center (MIOZ)
Figure 2A:
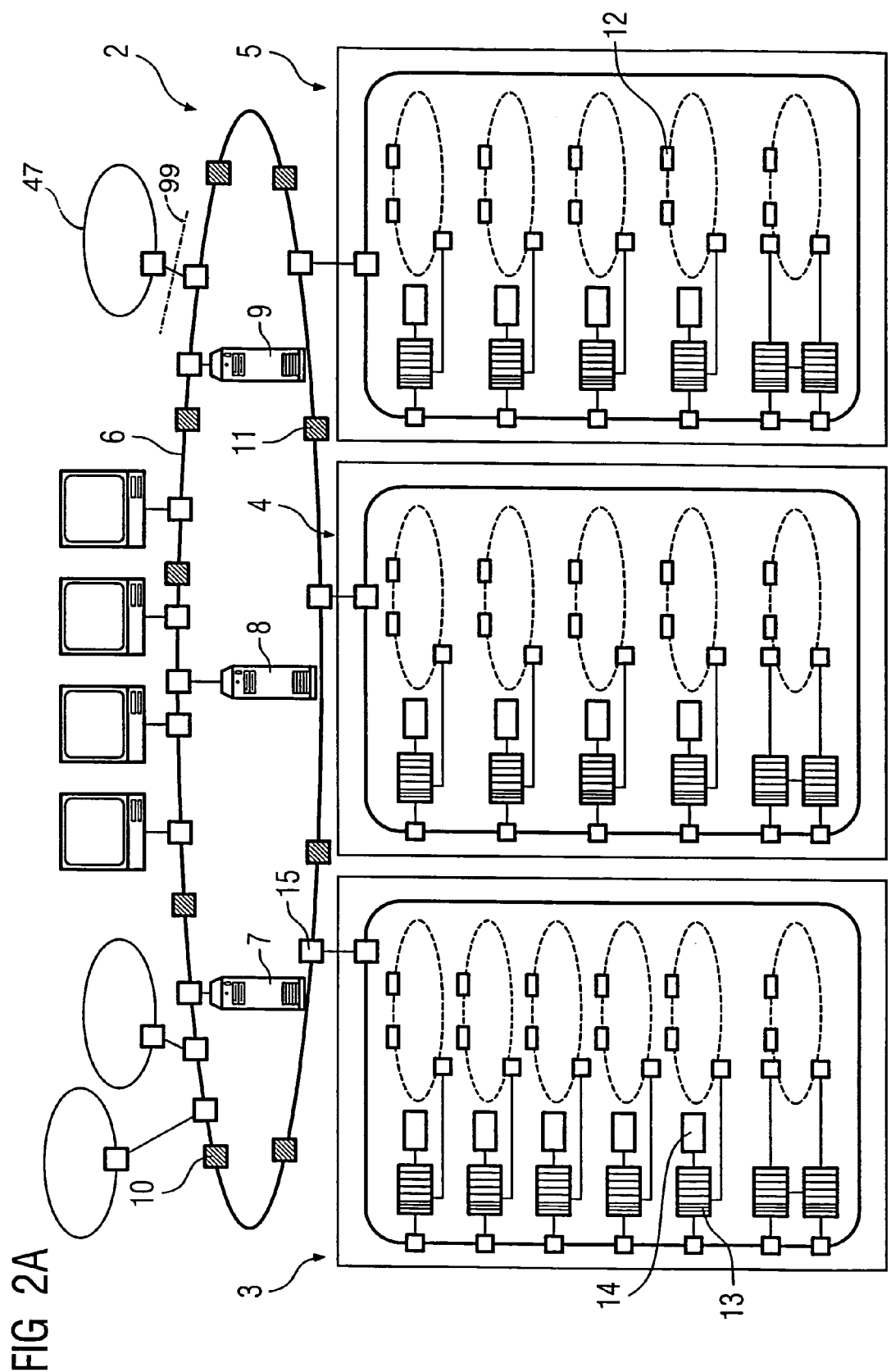
FIG. 2*a* is a schematic diagram of an integrated onboard information and data network.

All data acquisition is to be around the clock and automated, using intelligent peripheral units and suitable sensors, centralized for each department or for each ship protection zone 3, 4, 5, as depicted by way of example in FIG. 2*a*.

The sensors required therefor are at least partially configured as wireless sensors. Intelligent preprocessing of the data detected by the sensors can be performed in the sensors themselves. These sensors transmit their data and information to central units that are connected with the meshed onboard information and data network 2 of the automation and platform management system.

The workstation in the operator island 1 related to the automation and platform management system can be equipped, for instance, with two display units to monitor and control various systems described above and/or onboard states simultaneously. Up to four system windows can be set up in each display unit. A trackball is used for cross-operating the two display units and their four system windows.

As an alternative to this mode of operation, the operator can perform the operating actions and/or controls by voice input or direct entry. Important events, e.g., alarm messages, are transmitted by the automation and platform management system to the operator in plain language through headphones. If one of the aforementioned systems offers the capability of correcting malfunctions or functional restrictions by switching to redundant system parts, this is done automatically—to the extent possible—without requiring operator intervention or action in any form.

The operator island 1 of the multimedia information and operation control center is configured as a terminal that accesses a server constellation via a dual redundant fiber optic backbone ring bus 6, which can include, for example, three computers 7, 8, 9. One of these computers acts as the master while the other two are standby units. In normal operation, one computer or server 7, 8, 9 handles all of the operating and system functions as well as the system requirements. The standby computers or servers are continuously updated and can immediately assume all of the tasks of the master computer or server.

Figure 2B:
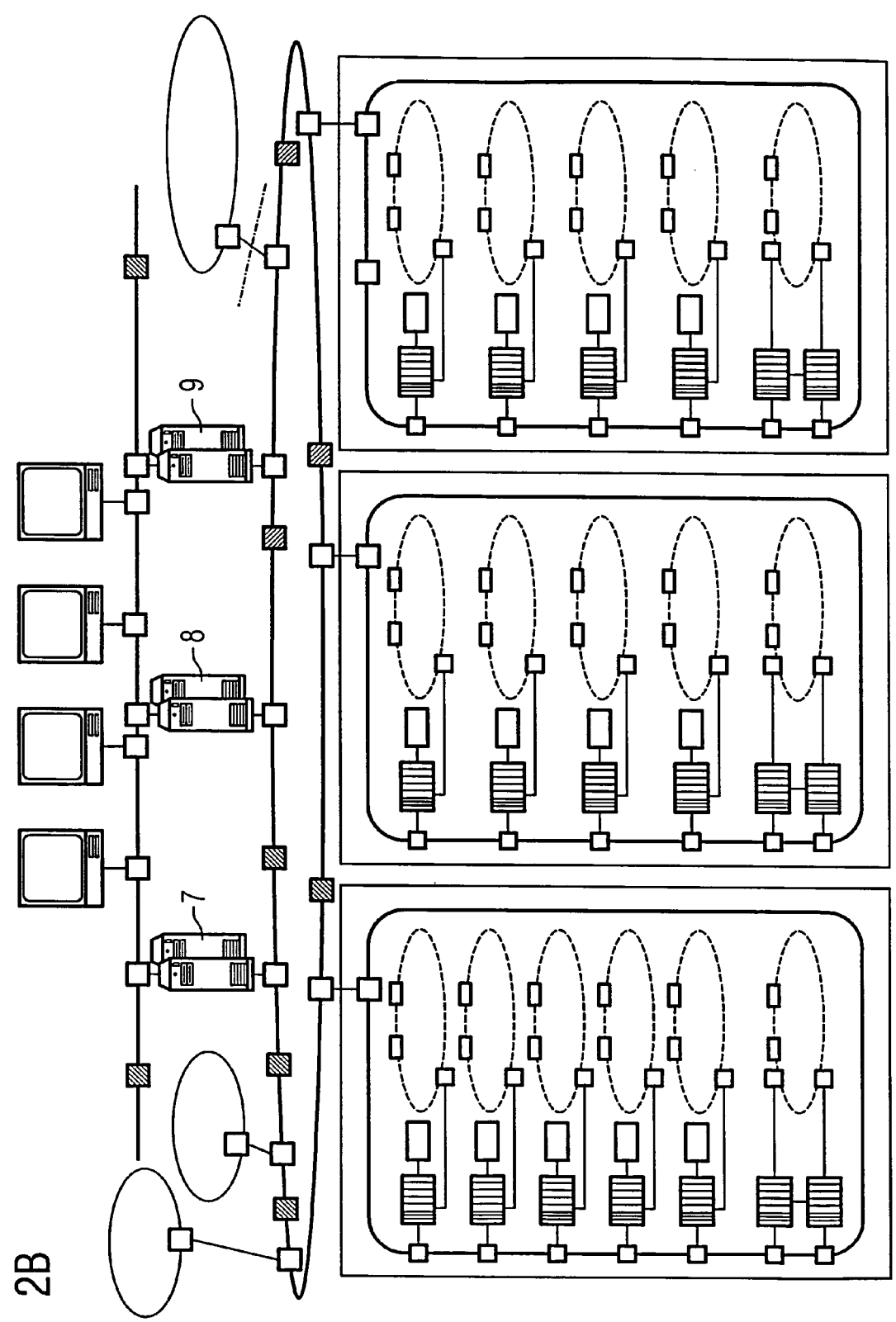
FIG. 2*b* is a schematic diagram of an alternative integrated onboard information and data network.

As shown in the embodiment of the integrated onboard information and data network 2 depicted in FIG. 2*b*, the computers or servers 7, 8, 9 can also be redundant. In this case they are spatially separated from one another, i.e., they are arranged as far forward and aft, portside and starboard, top and bottom as possible.

The two display units of the operator island 1 are, for example, high resolution 20-inch flat screens—an embodiment of e.g., a 28-inch flat screen is also feasible—and like the keyboard of the operator island 1 and the trackball, are controlled by the computers or servers 7, 8, 9. The keyboard of the operator island 1 consists primarily of special function keys, the assignment of which is tailored to the operation of the automation and platform management system.

The complete network architecture of the onboard information and data network 2 uses fiber optic technology and is thus insensitive to external electrical and electromagnetic influences.

The optical fibers used allow a high transmission rate and bandwidth. Nodes in the network, which consists of dual redundant fiber optic ring bus systems with high bandwidth, support these characteristics and at the same time ensure that all information and signals are available on several data paths.

In the backbone ring bus 6 of the onboard information and data network 2, interfaces 10 are provided, which are distributed throughout the ship and are available for connection to mobile operating terminals. With the aid of a correspondingly equipped notebook it is thus possible to operate and monitor the automation and platform management system in different departments depending on the availability of corresponding interfaces 10.

In addition, interfaces 11 are provided, which can be used to monitor a plurality of ships in port or at sea in clusters either from a land-based control station or from the multimedia information and operation control center of a ship. Such interfaces 11 are provided both portside and starboard of each ship equipped with the automation and platform management system.

To make it easy to exchange peripheral units 12, e.g., sensors, and to minimize the complexity of the cabling, the peripheral units 12 or sensors are—at least partially—configured as wireless units or wireless sensors. As such, they can be replaced comparatively easily. This also prevents extensive cable repairs in case of a fault or damage, e.g., due to weapons.

Furthermore, the peripheral units 12 are intelligent to enable data preprocessing to relieve the downstream arithmetic-logic units. For example, an analog sensor provided for pressure measurement no longer transmits a four to twenty mA signal, which would first have to be converted into a pressure value in a downstream arithmetic-logic unit or in a stored program controller, but transmits the data associated with the analog sensor, e.g., 0 to 100 bar, alarm at 95 bar, etc.

The other components of the automation and platform management system can also be easily replaced and taken back into operation within a short time.

Navigation, maintenance and deployment of a naval ship with a minimal crew and thus necessarily with a high degree of automation requires system-compatible software. Just as in the automated use of effectors of the naval ship with the aid of automated decision algorithms, in platform technology, too, it takes software to effectively support the crew and optimize utilization based on the actual state of the system.

The automation and platform management system is therefore preferably designed with future-oriented FüWES-compatible (guidance and weapons deployment system-compatible), adaptable system software with decision algorithms to effectively support the operators and to optimize the automation and monitoring functions.

Database and rule-based expert systems implement decision proposals and largely prevent operator errors. They are optimized online by entering experimental values of the operator and are quasi self-learning based on the frequency of acceptance by the operator of the decision proposals and based on the results.

The information and results of condition monitoring and evaluation of the automation and platform management system are transmitted to the various workstations in the FüWES operator islands and in the multimedia information and operation control center of the automation and platform management system, where they form deployment criteria for the deployment of the ship as a weapons system. Such deployment criteria can include, for example, available electric power, available propulsion power, remaining deployment range at a certain speed, tank contents and stability information for different displacement states and sea conditions.

The integrated onboard information and data network 2 of the automation and platform management system is configured as a data network segmented by danger zones or ship protection zones 3, 4, 5. As a consequence, faults of one data network segment do not affect the other data network segments. The onboard information and data network is redundant to the extent required. The diversified structure, often provided with reserves, takes into account the safety-relevant controls required for the survival and the maneuverability of the platform or the ship.

To further enhance the stability of the automation and platform management system, a decentralized power supply associated with the individual data network segments and electrically isolated from other power supplies is provided.

The hardware of the automation and platform management system is preferably highly impact and vibration resistant, has good EMC, proven acoustic and magnetic properties with high fault tolerance, is well field-tested and has a short MTTR (meantime to repair). The software used is preferably tested and qualified by corresponding standardization and widespread use.

The individual parts should preferably be commercially available, i.e., not parts built to Navy standards but COTS (commercial off-the shelf) parts.

To increase its stability, the automation and platform management system is divided into automated subsystems. To control each of these subsystems, a decentralized computer or processor 13 is provided, making available an independent intelligence on site. When the higher level is selected, this computer or processor 13 can maintain the function of its subsystem independently of the higher level. Such computers or processors 13 allocated to the respective subsystems should preferably be capable of being connected to each other and to the higher process control level by means of standard interfaces.

To obtain additional redundancy advantages, the subsystems should furthermore be equipped with on-site control panels 14. If the higher process control level fails, these control panels ultimately enable operation in direct proximity to the corresponding system, before the system switches to manual operation on the lowest operability level, which is usually required in naval construction.

The embodiment of the onboard information and data network 2 shown in FIG. 2a is furthermore provided with network nodes 15, which serve for meshing and ensure the availability of the data on several data paths.

The automation and platform management system can analyze itself, i.e., detect errors using so-called BITE (Built-In Test Equipment).

A plurality of operating states are monitored (condition monitoring) and trends of the units monitored and controlled by the automation and platform management system, e.g., rotating machinery, are analyzed by evaluating temperatures, pressures, vibrations and the acoustic behavior of the equipment and by mathematically linking a plurality of process parameters. This is to make it possible to detect potential damage early and to prevent total failure of the respective units by preventive/predictive maintenance.

Figure 3:
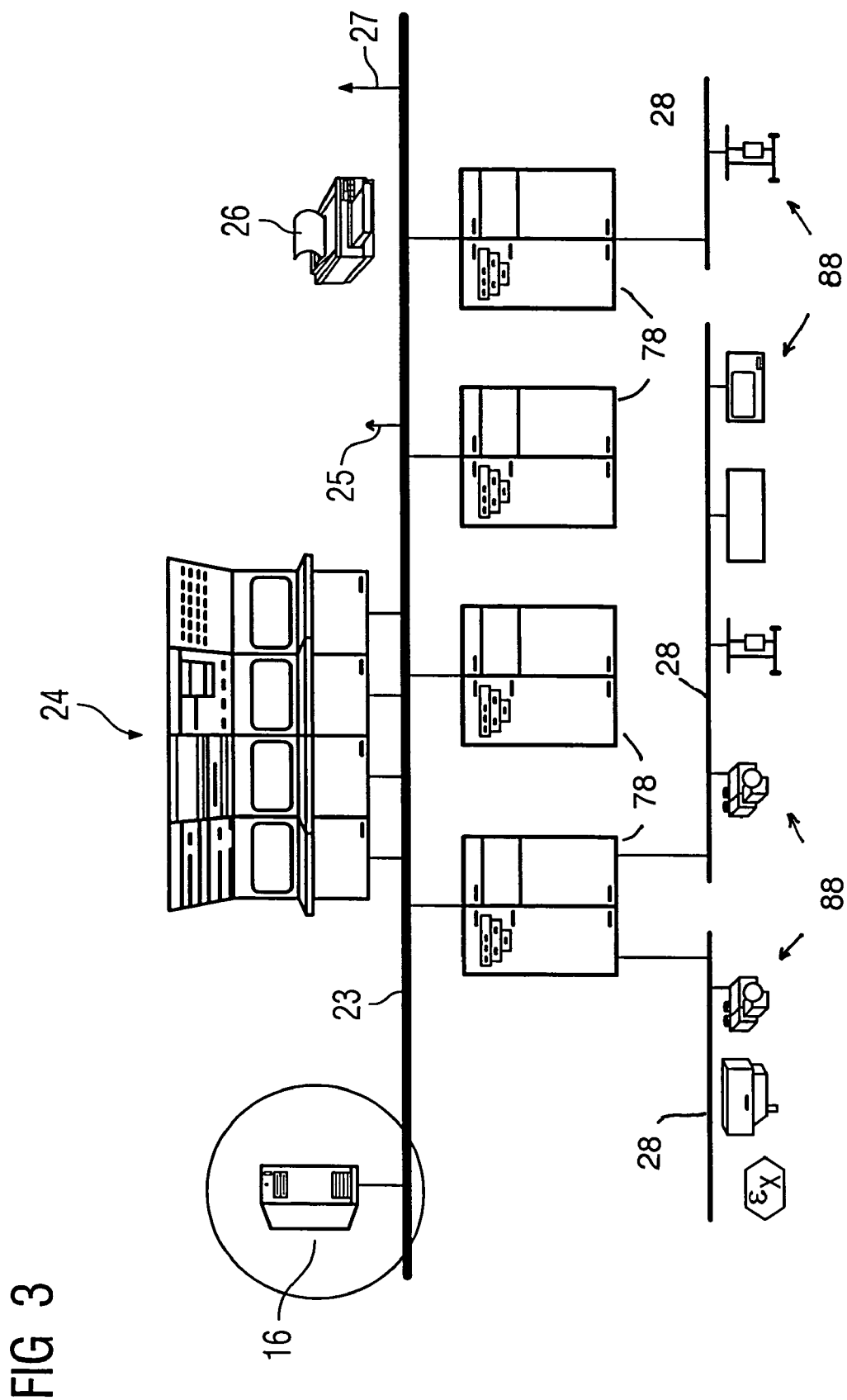
FIG. 3 shows components of the integrated onboard information and data network according to the invention provided for onboard logistics.
Figure 4:
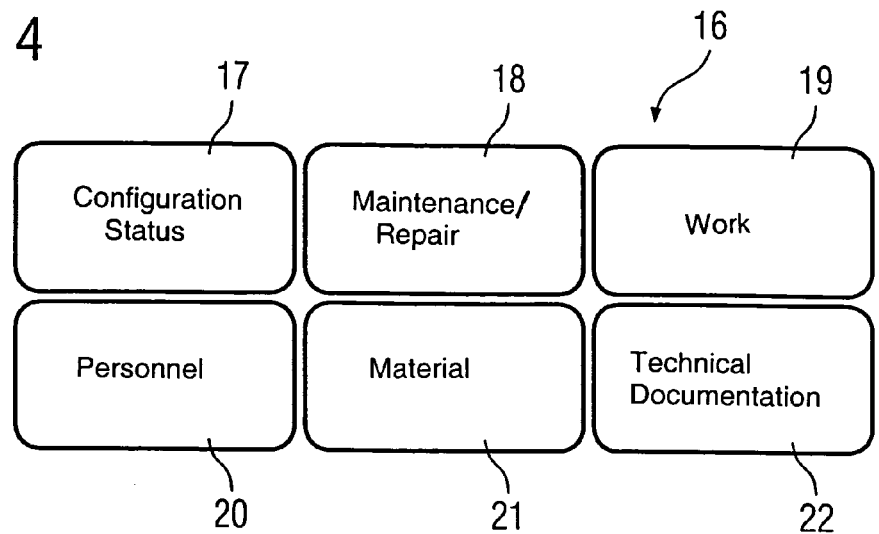
FIG. 4 illustrates the functions of the components of the integrated onboard information and data network according to the invention provided for onboard logistics.

For this purpose, a logistics server 16 is integrated into the onboard information and data network 2. This logistics server is shown in FIG. 3. Its functionalities are described in greater detail below with reference to FIG. 4.

The logistics server 16 has a first function block 17 containing data related to the configuration status. A second function block 18 contains maintenance and repair-related data. A third function block 19 contains data related to work performed, repair work, tools used, personnel involved, and additional measures or changes. A fourth function block 20 relates to the departments and their branches as well as to the associated personnel data. A fifth function block 21 contains component-related data. A sixth function block 22 relates to technical documentation data.

By a simple or a redundant Ethernet line 23 the logistics server 16 is connected to a control center 24 for process control and, via a port 25, to the remote configuration and maintenance, a LAN printer 26 and, via a port 27, to the ship's navigation system and weapons deployment coordination system, etc.

A plurality of LCUs (Local Process Units) 78 that are connected via Profibus lines 28 to peripheral units 88, e.g., sensors, actuators, etc., are connected to the Ethernet line 23.

Figure 5:
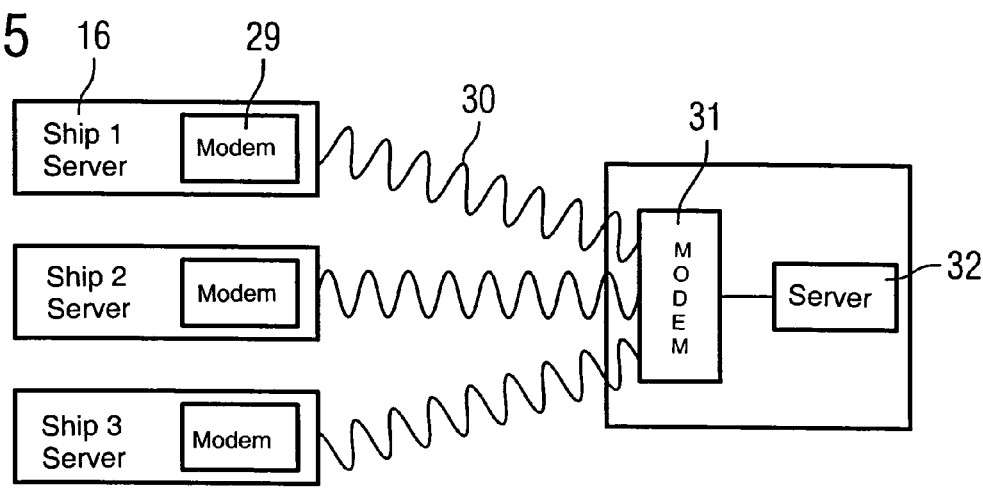
FIG. 5 is a schematic diagram of the communication means of the integrated onboard information and data network according to the invention.
Figure 6:
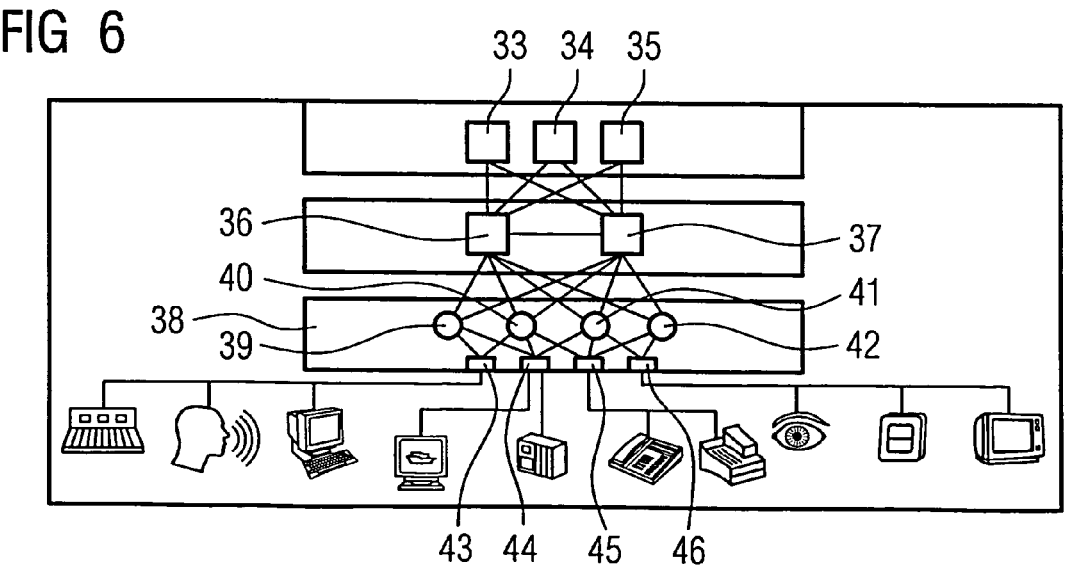
FIG. 6 shows the voice, video and integrated data transmission in the integrated onboard information and data network according to the invention.

As is best seen in FIG. 5, the logistics servers 16 of different ships can be connected via a modem 29 and a communications line 30 with a modem 31 assigned to a land-based server 32.

The automation and platform management system has a certified operating system to guarantee access security and data security. User administration is possible from each computer, i.e., from each operating terminal. The data necessary for administration is therefore available on each computer, i.e., it is stored in a distributed manner. In all of the segments of the onboard information and data network 2, redundant and diversified backup and storage media are provided. Ship-specific data is backed up separately.

In general, to guard against unauthorized access to the automation and platform management system, biometric access control is provided. This can be, for example user identification by fingerprints or iris scans.

The automation and platform management system is used to control both safety-relevant processes and non-safety-relevant processes. Both in safety-relevant processes and non-safety-relevant processes decisions and measures can be controlled by the system, or the system can request the user to make the decision.

If, for example, the ship is in the middle of a docking maneuver and, for example, a bearing is damaged on a main drive unit, it would not necessarily be in the operator's interest if the main drive unit were automatically shut down on the way to the pier. Thus, the operator himself would have to decide whether it would be better to continue to operate the main drive unit until the docking maneuver was completed.

For this purpose, the automation and platform management system can distinguish between different traveling modes, e.g., docking/landing maneuver, displacement mode, battle mode, etc. In addition, situation-dependent veto options by the operator are integrated.

To present the sequences and effects of automated processes and the acquired sensor and actuator data in a useful way to support the operator in his decision making, a full "consultant system" is proposed as an interface to the user in addition to the pure automation monitoring presentation with all the data and circuit combinations. This is a weighted extract from the process image of the automation and platform management system. In the context of this consultant system, the operator is to be provided with proposals for actions and corresponding instructions after an intelligent preprocessing of various process data, intelligent image analysis of video systems, e.g., smoke detection, infrared signature, motion detection, etc. This is to facilitate the handling and processing of roles.

If the consultant system evaluates the available data in the described manner, this automatically leads to a situation assessment that requires less personnel resources.

To facilitate the detection of the location of crewmembers, contactless identification systems are proposed. The crewmembers therefore carry, for example, chip cards or electronic IDs, which are used to register their presence automatically by scan functions when they enter a room.

The automation and platform management system is configured such that operating personnel can be trained in its operation with the aid of a so-called OBTS (On Board Training System). Learning programs are provided that the operator can use for training through self-study.

The above-described automation and platform management system can be remote-monitored and remote-controlled to simplify the watch operation in port or when several ships lie in clusters. The system can be connected to an operating terminal onboard another ship or to a land-based terminal via a direct cable connection or an Intranet/Internet connection.

To reduce the cabling complexity of the peripheral units 12 of the onboard information and data network 2, the peripheral units—to the extent possible—are configured for wireless data transmission and reception. For the bus systems forming the onboard information and data network 2, fiber optics are used to the extent possible. Switchgear cabinets, desks, consoles, etc., are made, for example, of carbon and glass fibers and light metals—again as far as possible.

Mobile operating and monitoring terminals can be connected to the automation and platform management system via interfaces 10 that are provided for this purpose among others.

In addition, e.g., voice input means, virtual keyboards and touch screens are provided on site in the area of the operating and monitoring terminals or in the MIOZ [multimedia information and operation control center].

The onboard information and data network 2 can be used for voice, video and integrated data transmission in a network. A network suitable for this purpose is shown in principle in FIG. 6. Three servers 33, 34, 35 each are connected to a network distribution 38 via central network nodes 36, 37, which are connected with each other. The network nodes 39, 40, 41, 42 of this network distribution are each connected to the two central network nodes 36, 37. These network nodes 39, 40, 41, 42 are in turn connected with peripheral units via switches 43, 44, 45, 46 and bus systems associated therewith. Each of the switches 43, 44, 45, 46 is connected with at least two of the network nodes 39, 40, 41, 42.

This basic configuration of the onboard information and data network 2 makes it possible for crew members of naval ships, when on sea duty for a prolonged period of time, to use a wide variety of systems for entertainment and continued education, e.g., the Internet, onboard video systems, etc.

FIG. 2a, in particular, shows that a connection to an Intranet 47 is possible via the network nodes 15, e.g., to the backbone ring bus 6 of the onboard information and data network 2. A firewall 99 is provided between the two network nodes that implement the connection. The Intranet 47 replaces the gateway computer to other systems, provided that a Web-capable server is available. The Intranet 47 can act quasi as an interface to the Internet.

Figure 7:
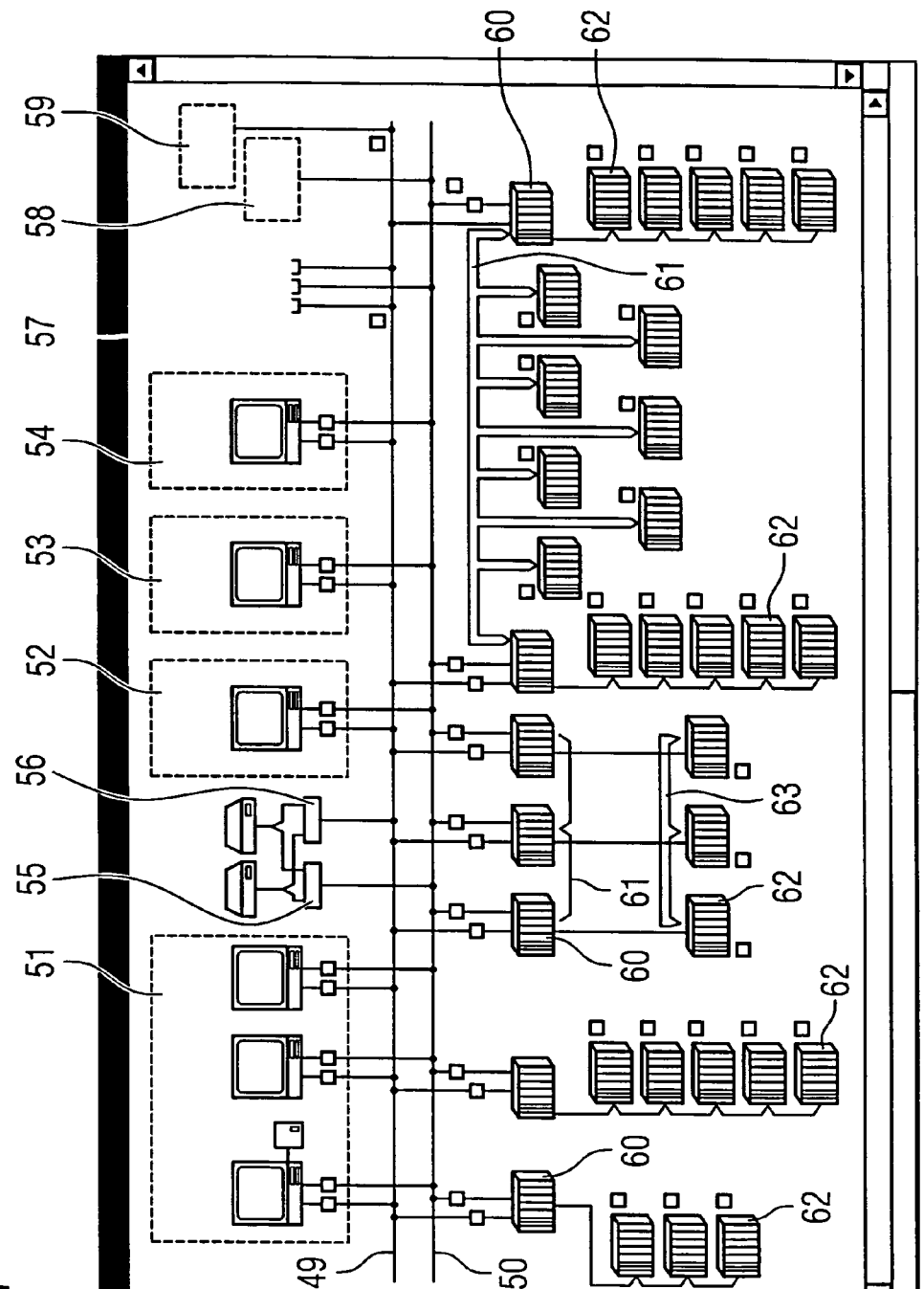
FIG. 7 shows an embodiment of predominant components of an automation and platform management system provided for a naval surface ship.

Furthermore, FIG. 7 in principle shows a portion of the onboard information and data network 2 of the automation and platform management system. In this embodiment depicted in FIG. 7, two separate copper Ethernet bus systems 49, 50 are provided. Via these two copper Ethernet bus systems 49, 50, a machinery control station 51, a rear damage control station 52, a front damage control station 53, a bridge station 54, two printer servers 55, 56, a network port 57 for portable operating terminals (not depicted in FIG. 7) and two interfaces 58, 59 by means of which the copper Ethernet bus systems 49, 50 can be connected to neighboring ships or to port systems, are connected to a plurality of local control units 60. Several of these local control units are connected to each other by means of a Profibus 61 and are assigned to several lower-level subcontrol units 62, which in turn can be connected to each other by means of bus systems.

Lower level control units 62 assigned to different control units 60 can also be connected with each other by a bus system 63.

With respect to the selected bus topology it should be noted that a dual redundant fiber optic Ethernet ring bus and an asynchronous transfer mode (ATM) network can be used.

Figure 8:
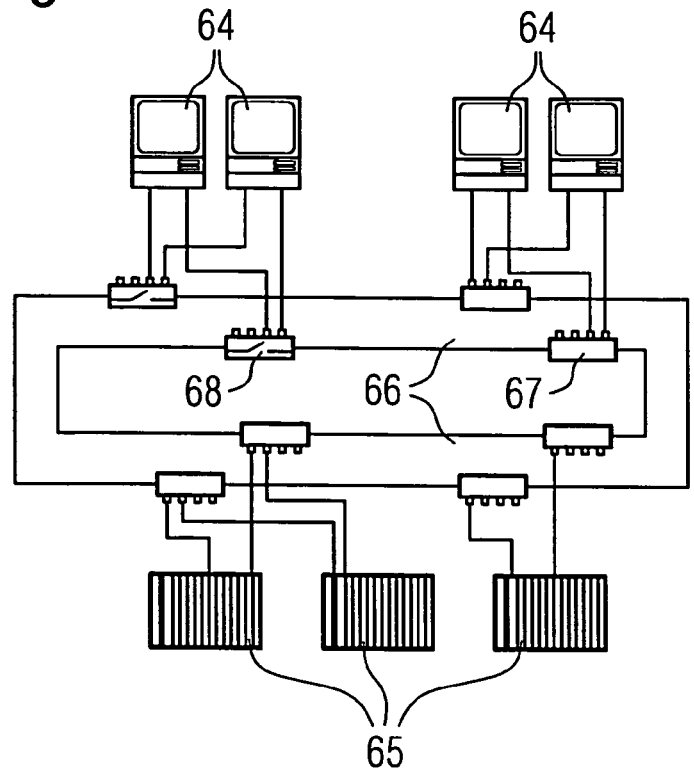
FIGS. 8 to 11 show embodiments of specific segments, as shown in FIG. 7, of the automation and platform management system according to the invention.

In an onboard information and data network 2 configured in this manner and shown in part in FIG. 8, the operating terminals 64 and the control units 65 are connected with the bus system 66 via so-called optical switch modules (OSMs), which are equipped with electrical and optical ports.

OSM technology, which is based on industry Ethernet technology, makes possible automation networks with large distances and a large number of network nodes. This substantially simplifies the configuration and design of the onboard information and data network 2.

The OSMs 67 represent separate collision domains that operate point-to point connections with the respective other OSMs 67 in the onboard information and data network. Because the data traffic is filtered, local data traffic remains local. Only data intended for other network nodes is transmitted to other OSMs 67. Common access to a transmission medium of all the OSMs present in the onboard information and data network 2 is thus eliminated, along with the corresponding control complexity.

The use of multimode graded-index fibers makes possible almost limitless network configurations in the area of marine applications with respect to the network spans.

Figure 9:
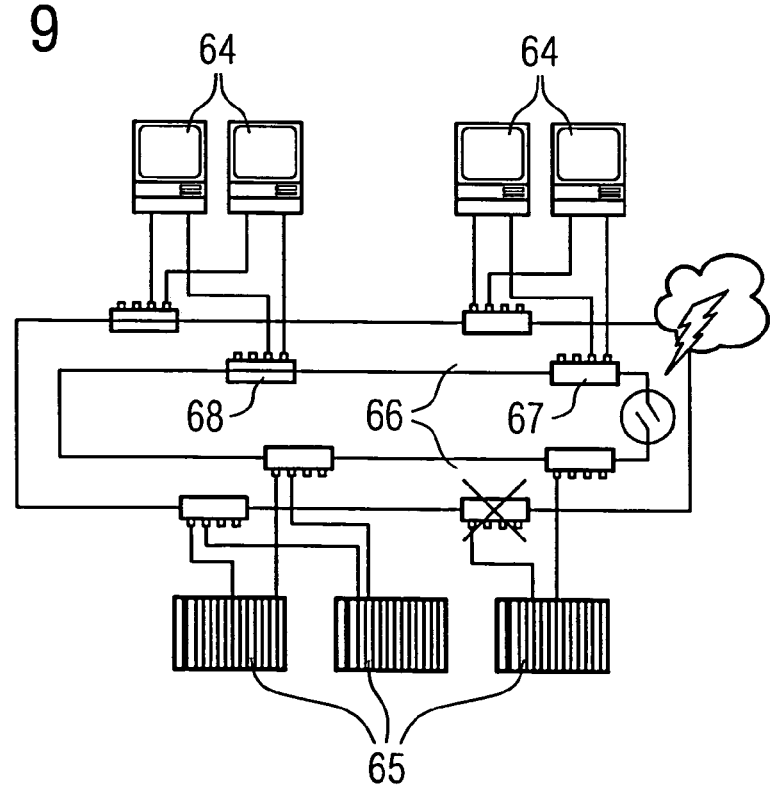

As shown in FIGS. 8 and 9, optical switching modules 68 can be operated as optical redundancy managers (ORMs) in the fiber-optic industry-Ethernet-ring-bus 66. The optical redundancy manager or the OSM 68 monitors the bus system 66, closes it briefly if an interruption occurs and thereby restores a functional bus configuration in the event of damage. With the aid of these OSMs 68 configured as optical redundancy managers it is possible to implement ring structures with an additional degree of media redundancy. Individual faults on the respective ring bus structures can be tolerated without data loss, as illustrated, for example, in FIG. 9.

This embodiment of the onboard information and data network 2, in conjunction with the multi-server concept, offers a redundant data bus system, redundant communication and thus a high degree of fault tolerance, reliability and survivability. The multi-server design enables rapid communication. The number of logic operations is low, resulting in a low communications load. Each control unit is connected to a server but not to all operating terminals. A master process data record exists for all operating terminals.

Figure 10:
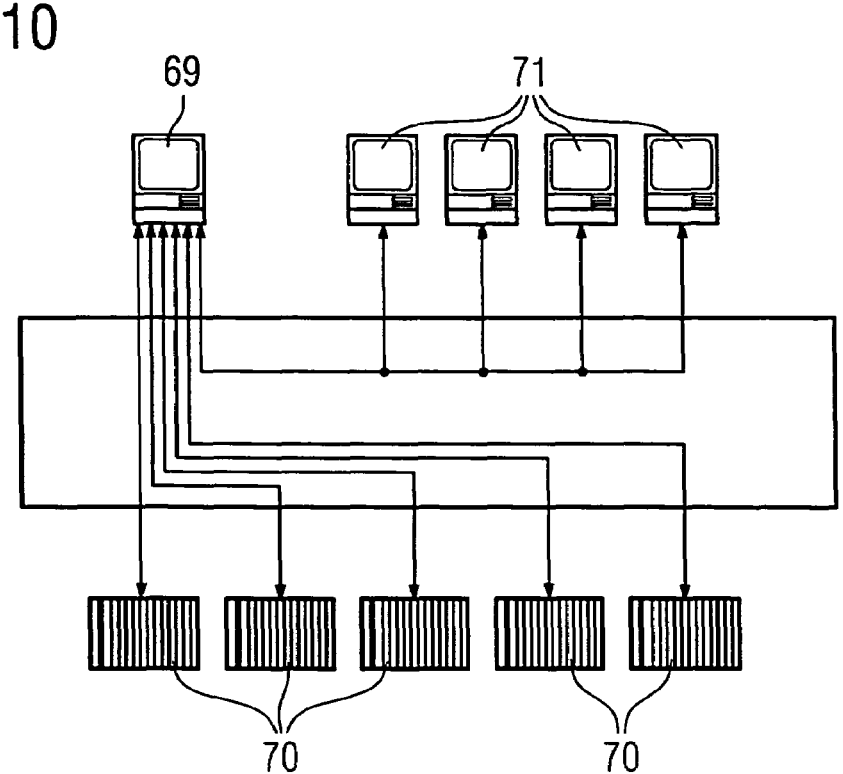

The embodiment shown in principle in FIG. 10 has a communications structure in which the operating terminal 69 shown on the left side of the figure assumes the master function. The control units 70 are all connected to this operating terminal 69. The operating terminal 69 exercising the master function is in turn connected to additional operating terminals 71.

Figure 11:
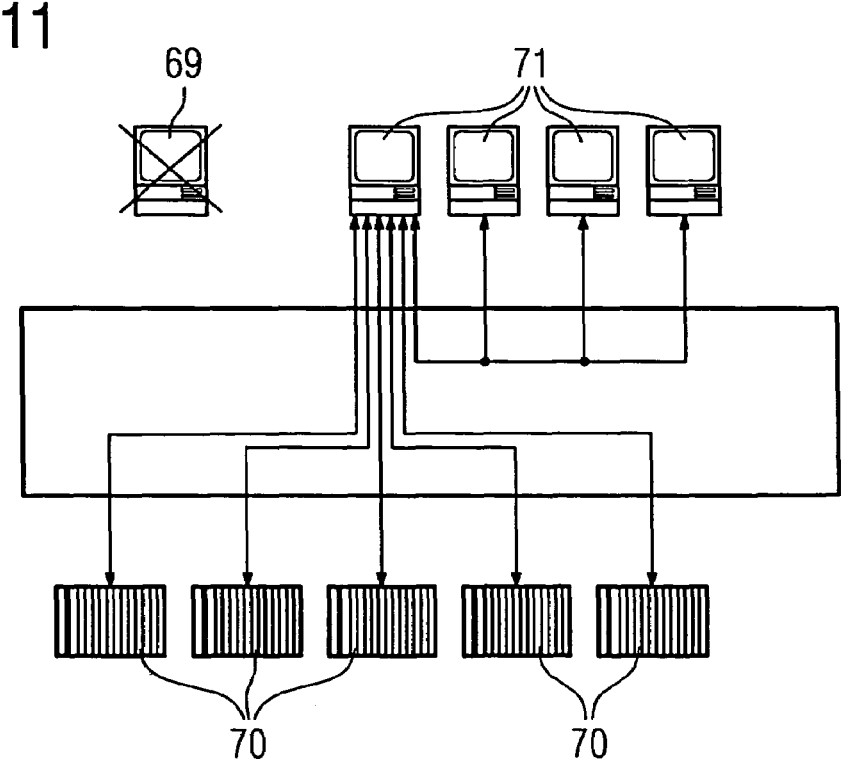

If the operating terminal 69 shown on the left in FIG. 10 fails, the control units 70 are connected without any delay to the operating terminal 71 shown on the left in FIG. 11. This occurs without delay. The operating terminal 71 on the left in FIG. 11 directly assumes the master or server function.

In this embodiment illustrated in FIGS. 10 and 11, the basic concept is that all operating terminals 69, 71 are identical in their installation and function. If necessary, each individual operating terminal 69, 71 can perform the master or server function in addition to its actual operating terminal tasks. However, only one operating terminal 69, 71 simultaneously assumes the master function. An algorithm in the multi-server function determines which operating terminal 69, 71 is responsible for assuming the master tasks. All other operation terminals 71 are slaves at this time.

The operating terminal 69, 71 exercising the master function manages the master data record of the process information and sends it automatically to all the other connected operating terminals 71, which act as slaves. If necessary, an operating terminal 71 acting as a slave can request an update for current process information, e.g., if an operating terminal 71 acting as a slave is restarted or if messages from the operating terminal 69, 71 acting as the master are lost due to damage.

If the operating terminal 69, 71 acting as the master fails, the multi-server function detects this failure and automatically switches the master function to the next operating terminal 71 according to the algorithm. In communications engineering terms, this switch from an operating terminal 69, 71 exercising the master function to the next operating terminal 71, which is to assume the master function, implies the interruption of all the connections to the operating terminal 69, 71 of all the control units 70 and the operating terminals 71 acting as slaves and the reestablishment of these connections to the operating terminal 71, which will now assume the master function. The switch occurs so quickly that the user will not notice it.

The multi-server function implemented on a higher communications level is thus the basis for comprehensive redundancy. With n installed operating terminals 69, 71, n-1 operating terminals 69, 71 can thus fail without any loss of operating terminal or server functionality.

Different intelligent sensors can be used as peripheral units 12. These sensor units have an analog hardware design, optics, ASICs (Application Specific Integrated Circuits) and the like, and are operated using integrated software algorithms.

In one embodiment, such digital sensors combine an electro-optic design with image processing software and a complex mathematical algorithm. By analyzing multi-parameter signature signals they are capable of distinguishing a pet from a small child, for example. They are of course available in wireless and wired form.

The same is true for intelligent sensors with motion vector analysis, which can effectively distinguish between permitted and non-permitted motions by analyzing the motion direction.

Digital dual technology sensors combine a microwave transceiver, which is based on the Doppler effect, with a passive infrared sensor, which responds to infrared radiation emitted by the human body. A software algorithm integrated into these units converts human movement into signals. The signals are analyzed by the two technologies simultaneously, and any alarm signals are generated only if both technologies detect a security issue. As a result, these dual technology sensors are useful in locations exposed to interference by wind, sun or other extreme elements.

Intelligent, passive infrared sensors as digital and analog sensors respond to temperature changes triggered by infrared radiation emitted by the human body. This radiation is picked up by sensors with pyro-elements and is converted from an analog to a digital signal. A microprocessor then checks whether the signal is from a human source. Like the other sensor types described above, these sensors, too, are available in wireless and wired versions.

Intelligent glass breakage alarms identify the noise of breaking glass. They are based on dual technology, which detects both the low frequencies of the impact and the high frequencies of the splintering glass. They use noise averaging technology, which filters background noise so that interfering signals from other noise sources, e.g., air conditioning systems or bells, are suppressed. Here, too, wireless and wired versions are available.

Such actuators and sensors used in the automation and platform management system can be powered from ambient energy sources. Circuit elements, for example, can be powered by the mechanical energy of the actuation, temperature sensors by the temperature drops relative to the environment, vibration sensors by the vibration energy, position sensors by the motion, lighting sensors by the light energy, etc.

For instance, a light switch, when actuated, can emit a radio signal that contains a unique number. This signal can be detected at a distance of up to 300 m by a receiver, which now switches the associated lamp on or off. Such radio switches without batteries make it possible, for example, to control entire installation systems without requiring the switches to be wired.

Such radio switches are powered, for example, by the actuation force and can be configured as readily integratable transmitter modules. All other functions, such as switching, dimming and controlling, can be realized. Each transmitter already contains a unique 32-bit address when it is manufactured. Its range—as mentioned above—is up to 300 m in free propagation.

The receiver module is compact and can be combined with specific power modules. Accordingly, many different applications can be realized, such as light and drive controls. An open interface makes it possible to integrate the modules in any system. On final installation each receiver module is modified so that it responds only to signals from the transmitter modules assigned to it.

Other peripheral units that come into consideration are infrared camera systems, which are available in versions that meet military as well as e.g., space specifications. The thermal camera and the lens are received in a housing that is filled with dry nitrogen and is under pressure. The camera works at voltages of 12 VDC and higher. A watertight connector is provided for PWRON/OFF, BLACK/HOT-WHITE/HOT, RS-170 VIDEO OUT, +12 VDC, GND and UP/DOWN electrofocusing. A heating unit for the output opening ensures operation even under unfavorable climatic conditions. Furthermore, certain filter circuits or protective circuits are provided to protect the unit against high-energy electromagnetic interference.

The above description of the preferred embodiments has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. An automation and platform management system for a vessel, operated from an operator island of a multimedia information and operation control center, comprising:
    a system for monitoring and commanding the ship,
    a system for navigating the ship,
    a system for coordinating weapons deployment,
    a system for handling the external and internal radio communications,
    a system for controlling and handling information distribution,
    a system for power generation and distribution,
    a system for monitoring ship operations,
    a system for automated ship damage control,
    an integrated onboard information and data network, and
    an integrated system for monitoring and controlling a combined pod and waterjet drive of the ship.

2. An automation and management system as claimed in claim 1, further comprising:
    an emergency control console for an automated ship support and command and control system.

3. An automation and management system as claimed in claim 2, wherein the emergency control console is arranged in a stern near a podded drive of the combined pod and waterjet drive.

4. An automation and management system as claimed in claim 1, wherein the integrated onboard information and data network comprises intermeshed partial networks.

5. An automation and management system as claimed in claim 1, further comprising an interface enabling operation of the support system from a land-based operating terminal.

6. An automation and management system as claimed in claim 1, further comprising sensors with built-in data pre-processing for detecting parameters.

7. An automation and management system as claimed in claim 1, further comprising a bus device, and intelligent actuator units converting signals received via the bus device into values for actuating, respectively, the actuator units.

8. An automation and management system as claimed in claim 1, wherein the ship is subdivided into a plurality of ship protection zones, and wherein said system further comprises a respective central data collection unit for each of the ship protection zones.

9. An automation and management system as claimed in claim 1, further comprising a system for monitoring and detecting crewmember locations, comprising at least one of wireless sensors, intelligent video camera systems, and contactless proximity detectors.

10. An automation and management system as claimed in claim 1, wherein data communication in the onboard information and data network is multiply redundant by meshing the network and by providing a high bandwidth for transmitting the information and the data.

11. An automation and management system as claimed in claim 1, wherein the operator island comprises at least two display units configured to be cross-operated via a keyboard and a trackball device, and headphones used to transmit alarm messages.

12. An automation and management system as claimed in claim 1, wherein the onboard information and data network comprises a plurality of servers with a plurality of computers, one of the computers operating as a master and remaining ones of the computers operating in standby operation, wherein the computers operating in standby operation are continuously updated.

13. An automation and management system as claimed in claim 1, wherein the onboard information and data network comprises independent partial systems, each of which is assigned a computer unit having a mode of operation independent of other computer units.

14. An automation and management system as claimed in claim 13, further comprising on-site control panels respectively assigned to the computer units.

15. An automation and management system as claimed in claim 1, further comprising an interface configured to connect with a corresponding automation and management system of another ship.

16. An automation and management system as claimed in claim 1, further comprising at least one of wired and wireless links to a higher-level management system of the onboard information and data network.

17. An automation and management system as claimed in claim 1, wherein the onboard information and data network comprises an onboard Intranet providing entry and retrieval of information.

* * * * *